US007569262B2

(12) United States Patent
Szabo et al.

(10) Patent No.: US 7,569,262 B2
(45) Date of Patent: Aug. 4, 2009

(54) FLEXIBLE MONOLAYER ELASTOMER FILMS AND BAG FOR MEDICAL USE

(75) Inventors: Emery Szabo, Pineville, NC (US); Robert Elcik, Los Alamitos, CA (US); Daniel Gelfand, Cerritos, CA (US)

(73) Assignee: Renolit AG, Worms (DE)

( * ) Notice: Subject to any disclaimer, the term of this patent is extended or adjusted under 35 U.S.C. 154(b) by 0 days.

(21) Appl. No.: 10/470,691

(22) PCT Filed: Jan. 31, 2002

(86) PCT No.: PCT/US02/02624

§ 371 (c)(1),
(2), (4) Date: Mar. 19, 2004

(87) PCT Pub. No.: WO02/060979

PCT Pub. Date: Aug. 8, 2002

(65) Prior Publication Data

US 2004/0146671 A1    Jul. 29, 2004

Related U.S. Application Data

(60) Provisional application No. 60/265,325, filed on Feb. 1, 2001, provisional application No. 60/265,324, filed on Feb. 1, 2001, provisional application No. 60/265,326, filed on Feb. 1, 2001, provisional application No. 60/265,882, filed on Feb. 5, 2001, provisional application No. 60/265,883, filed on Feb. 5, 2001.

(51) Int. Cl.
*A61L 29/04* (2006.01)
*A61L 29/00* (2006.01)
*C08L 23/00* (2006.01)
*C08L 23/08* (2006.01)

(52) U.S. Cl. ............. 428/35.2; 428/36.91; 428/516; 428/515; 428/36.92; 428/500; 138/118; 138/137; 138/177

(58) Field of Classification Search ............. 428/35.7, 428/36.92; 525/222, 240; 604/408
See application file for complete search history.

(56) References Cited

U.S. PATENT DOCUMENTS 4,140,162 A    2/1979    Gajewski et al.

(Continued)

FOREIGN PATENT DOCUMENTS

EP    0 679 685 A1    4/1995

(Continued)

OTHER PUBLICATIONS

Japanese Office Action, issued in Corresponding Japanese Patent Application No. 2002-561544, dated on Aug. 23, 2007.

*Primary Examiner*—David R Sample
*Assistant Examiner*—Ellen S Wood
(74) *Attorney, Agent, or Firm*—McDermott Will & Emery LLP

(57) ABSTRACT

Soft, flexible films suitable for human skin contact are required for disposable medical devices. Soft, flexible monolayer elastomer films have been developed that are suitable for human skin contact and provide improved low-temperature flexibility and improved strength to weight ratio over conventional polyvinyl chloride films for medical uses. Embodiments of the flexible monolayer elastomer film include styrene-ethylene-propylene-styrene block copolymers (SEPS), SEPS/polyolefin mixtures, SEPS/polyolefin/ethylene-vinyl acetate (EVA) copolymer mixtures, and EVA/polyolefin mixtures.

8 Claims, 1 Drawing Sheet

U.S. PATENT DOCUMENTS

| | | | |
|---|---|---|---|
| 4,440,815 A | | 4/1984 | Zomorodi et al. |
| 4,479,989 A | | 10/1984 | Mahal |
| 4,814,375 A | | 3/1989 | Esposito |
| 5,274,035 A | | 12/1993 | Chundury |
| 5,320,899 A | | 6/1994 | Djiauw |
| 5,738,923 A | * | 4/1998 | Ko et al. ............... 428/36.91 |
| 6,017,598 A | | 1/2000 | Kreischer et al. |
| 6,124,428 A | | 9/2000 | Peiffer et al. |
| 6,166,142 A | * | 12/2000 | Zhang et al. .............. 525/201 |
| 6,503,612 B1 | * | 1/2003 | Copeland ................ 428/220 |
| 6,531,520 B1 | * | 3/2003 | Bambara et al. ............ 521/50 |
| 6,538,068 B1 | * | 3/2003 | Degrand ................. 525/191 |
| 6,676,871 B1 | * | 1/2004 | Benassi et al. ............ 264/154 |
| 2002/0013415 A1 | * | 1/2002 | Mechelaere et al. ......... 525/191 |
| 2002/0016381 A1 | | 2/2002 | Kroll et al. |
| 2002/0028882 A1 | | 3/2002 | Tasaka et al. |
| 2002/0052585 A1 | | 5/2002 | Thomas et al. |
| 2003/0027008 A1 | * | 2/2003 | Eckstein et al. ............. 428/516 |

FOREIGN PATENT DOCUMENTS

| | | |
|---|---|---|
| EP | 0 703 279 | 3/1996 |
| EP | 0 744 441 | 11/1996 |
| EP | 0 765 654 | 4/1997 |
| EP | 0 902 051 | 3/1999 |
| EP | 0 740 544 | 10/2001 |
| JP | 5043770 | 2/1993 |
| JP | 07-292174 | 11/1995 |
| JP | 10-120840 | 5/1998 |
| WO | WO 94 18273 | 8/1994 |
| WO | WO 00 61062 | 10/2000 |
| WO | WO 200100408 A1 * | 1/2001 |

* cited by examiner

FLEXIBLE MONOLAYER ELASTOMER FILMS AND BAG FOR MEDICAL USE

This application is a 371 of PCT/US02/02624, filed Jan. 31, 2002; which claims priority from U.S. Provisional Applications 60/265,324, filed Feb. 1, 2001; 60/265,325, filed Feb. 1, 2001; 60/265,326, filed Feb. 1, 2001; 60/265,882, filed Feb. 5, 2001; and 60/265,883, filed Feb. 5, 2001; the entire disclosures of each of which are herein incorporated by reference.

TECHNICAL FIELD

The present invention relates to the field of flexible monolayer elastomer films, and more particularly, to an improved elastomer film for medical uses, such as disposable medical devices.

BACKGROUND OF THE INVENTION

An important aim of ongoing research in the disposable medical device industry is to provide soft, non-tacky packaging suitable for contact with human skin without the use of plasticizers. A further aim of ongoing research is to provide flexible packaging for biological and pharmaceutical materials, which does not become brittle while undergoing liquid nitrogen storage.

Films used in the fabrication of disposable medical devices require several specific attributes. Among the attributes are clarity, ability to seal using radio frequency (RF), flexibility, conformance to United States Pharmacopoeia (USP) Class VI and European Pharmacopoeia $3^{rd}$ edition 3.1.6 test protocol, extremely low levels of extractables, excellent barriers to water vapor transmission, permeability to gases, resistance to change during sterilization via autoclaving, gamma radiation, or ethylene oxide, and, as required, compatibility with medical products contained in the disposable medical device. In addition, it is desirable that the films have a soft, non-tacky texture because they will come in contact with human skin.

In certain applications, it is required that the disposable medical devices be capable of prolonged storage in liquid nitrogen. A film that remains flexible and does not become brittle when stored in liquid nitrogen is required for storage of biological products, such as stem cells and bone marrow.

In addition, the film used for packaging medical products should have extremely low levels of extractable and leachable materials to avoid contamination of the stored material. For example, anti-cancer pharmaceuticals, such as taxol, are particularly prone to contamination by plasticizers, such as oils, leaching from conventional storage bags. In another example, extractable metals, such as aluminum, are unacceptable for peritoneal dialysis uses. Aluminum levels above about 11 ppb exacerbate certain illnesses, including anemia and encephalopathy.

Polyvinyl chloride (PVC) films conform to a number of these requirements and are conventionally used as a flexible medical product packaging material. PVC provides a relatively inexpensive, clear, soft, and flexible film for medical products packaging. In addition, PVC is relatively inert and contains low levels of extractable materials. However, to impart softness and flexibility to PVC films, plasticizers are added to PVC resins. The plasticizers are typically oils added in the hundreds of ppm range. While the amount of oil is acceptable for many medical end uses, plasticizer tends to leach from the film. The amount of plasticizer that leaches from the PVC film is unacceptable for storage of certain pharmaceuticals, such as the anti-cancer drug taxol.

PVC formulations also require a heat stabilizer to prevent the PVC from undergoing heat degradation and color change during and after processing. Heat stabilizers are extracted from the PVC by aqueous solutions stored in the bag.

Another important characteristic of biological packaging is gas permeability. Living cells, such as red blood cells and platelets, need to exchange oxygen and carbon dioxide. PVC gas permeability decreases as plasticizer levels decreases. Thus as the amount of plasticizer is increased to provide high gas permeability in PVC based medical bags, the amount of plasticizer used and the amount of plasticizer that leaches into the stored material also increases.

PVC is not suitable for liquid nitrogen storage of biological materials, such as stem cells or bone marrow. PVC becomes brittle when stored in liquid nitrogen.

Various replacements for PVC film as a component of disposable medical devices have been disclosed. U.S. Pat. No. 4,140,162 discloses clear, blow-moldable medical packaging. However, the disclosed composition comprises an antioxidant material and Kraton G, a styrene-ethylene-butylene-styrene copolymer (SEBS). SEBS is tacky and rubbery and does not provide the soft PVC-like texture desired for human skin contact.

U.S. Pat. No. 4,440,815 discloses a clear, flexible, thermoplastic medical liquid container comprising a mixture of SEBS, polypropylene, ethylene-lower alkyl acrylate polymer, and mineral oil. The mineral oil is added to improve clarity and flexibility. However, mineral oil is susceptible to leaching and subsequent contamination of the material stored in the medical liquid container.

U.S. Pat. No. 4,814,375 discloses a soft, high strength elastomeric composition for use in medical and pharmaceutical products comprising SEBS, a mineral oil plasticizer to soften the SEBS, and an acrylic resin.

U.S. Pat. No. 4,479,989 discloses a film material for use in sterilized medical solution containers comprising linear low-density polyethylene (LLDPE) and SEBS.

U.S. Pat. No. 6,017,598 discloses a medical bag comprising multiple polymer film layers, wherein one of the layers comprises a matrix comprising a block copolymer, such as SEBS, and a polyolefin.

EP 0 740 544 B1 discloses a plastic formulation for a storage container for blood components comprising an ethylene-vinyl acetate copolymer (EVA), SEBS, and ultra-low density polyethylene (ULDPE).

The term "disposable medical devices" as used herein, is not to be limited to the specifically disclosed embodiments. Disposable medical devices, as used herein, includes storage containers for medical products, such as blood component bags, peritoneal dialysis sets, drainage collection bags, intravenous solution storage, and drug delivery systems.

The term "medical products" as used herein, is not to be limited to the specifically disclosed embodiments. Medical products, as used herein, includes nutritional products; biological products, such as stem cells, blood components, and bone marrow; and pharmaceutical products, such as peritoneal dialysis solutions and drugs, such as taxol.

The term "essentially free of leachable material", as used herein, means there is either no leachable material in the flexible monolayer elastomer film or the amount of leachable material is so low as to not adversely affect the medical products stored within disposable medical devices formed from the flexible monolayer elastomer film. No leachable materials, such as plasticizers, are added to the elastomer film material. The flexible monolayer elastomer films meet the European Pharmacopoeia $3^{rd}$ edition 3.1.6 and USP Class VI test protocols.

The term "texture", as used herein, means the tactile quality of the surface of the flexible monolayer elastomer film.

The term "the texture being substantially that of plasticized polyvinyl chloride", as used herein, means that the texture of the flexible monolayer elastomer film is like that of plasticized polyvinyl chloride films conventionally used in disposable medical devices, such as the films in Comparative Examples 1-5 of the instant disclosure.

SUMMARY OF THE INVENTION

There exists a need in the disposable medical device art to provide a medical product packaging material, which has a texture like that of plasticized polyvinyl chloride and is free of any leachable material, such as plasticizer. There exists a need in this art to provide medical product packaging material that can be stored in liquid nitrogen without becoming brittle. There exists a need in this art to provide a medical product packaging material that can be sterilized by autoclaving, irradiation, or ethylene oxide. There exists a need in this art to provide an economical medical product packaging material that is heat welded or radio frequency (RF) welded to form a flexible, monolayer, gas-permeable, elastomer bag for storing liquid medical products.

These and other needs are met by embodiments of the present invention, which provide a flexible monolayer elastomer film comprising a styrene-ethylene-propylene-styrene block copolymer. The film has a texture substantially that of plasticized polyvinyl chloride and the film is essentially free of leachable material.

The earlier stated needs are also met by certain embodiments of the instant invention which provide a flexible monolayer elastomer film comprising from about 55% to about 75% by weight of an ethylene-vinyl acetate copolymer and from about 25% to about 45% by weight of a metallocene catalyzed ethylene-octene copolymer. The film has a texture substantially that of plasticized polyvinyl chloride and the film is essentially free of leachable material.

The earlier stated needs are further met by certain embodiments of the instant invention including a flexible monolayer bag for storing medical products, wherein the bag is RF welded from a flexible monolayer elastomer film comprising a styrene-ethylene-propylene-styrene block copolymer. The film has a texture substantially that of plasticized polyvinyl chloride and the film is essentially free of leachable material.

The earlier stated needs are further met by certain embodiments of the instant invention including a flexible monolayer bag for storing medical products, wherein the bag is formed from a flexible monolayer elastomer film comprising from about 55% to about 75% by weight of an ethylene-vinyl acetate copolymer and from about 25% to about 45% by weight of a metallocene catalyzed ethylene-octene copolymer. The film has a texture substantially that of plasticized polyvinyl chloride and the film is essentially free of leachable material.

DETAILED DESCRIPTION OF THE INVENTION

Figure 1:
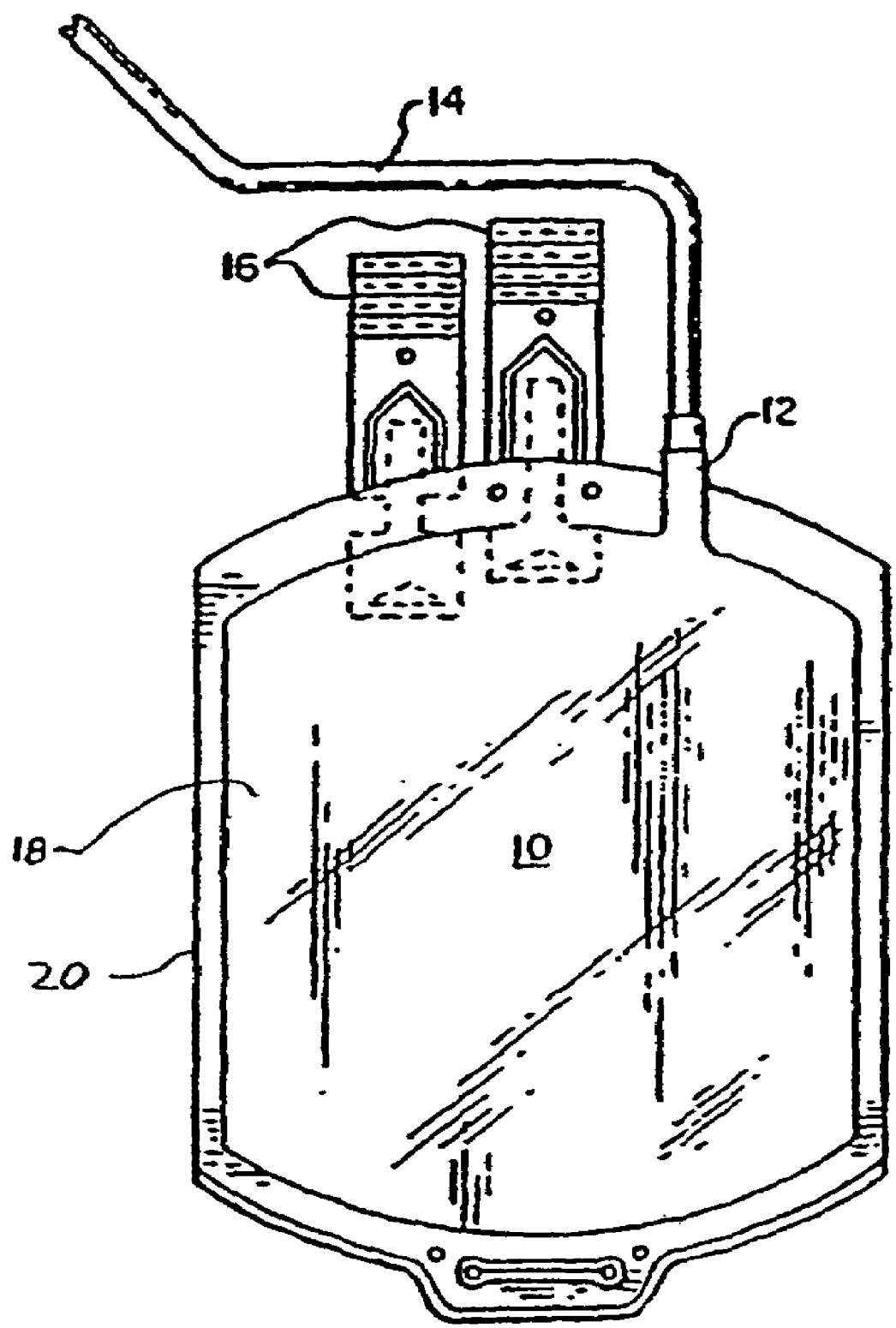
FIG. 1 is a plan view of a flexible monolayer blood component bag of the instant invention that is made from a flexible monolayer elastomer film of the present invention.

The present invention enables the production of disposable medical devices with improved inertness towards medical products stored therein, improved flexibility, improved gas permeability, and improved low temperature storage properties. The present invention provides soft plasticized polyvinyl chloride-like texture without the use of leachable plasticizers and surfactants. The present invention further provides a gas permeable disposable medical device which main remains flexible when stored in liquid nitrogen. These benefits are provided by a flexible monolayer elastomer film comprising a styrene-ethylene-propylene-styrene block copolymer (SEPS) that is essentially free of leachable materials. These benefits are also provided by a flexible monolayer elastomer film that is essentially free of leachable materials comprising an ethylene-vinyl acetate copolymer (EVA) and a metallocene catalyzed ethylene-octene copolymer.

The flexible monolayer elastomer film of the instant invention has a soft, flexible, dry feel similar to that of conventional plasticized PVC medical films. The flexible monolayer elastomer film of the instant invention has suppleness similar to that of conventional plasticized PVC medical films. The elastomer film of the instant invention also has excellent clarity. Disposable medical devices are easily fabricated from the film by radio frequency (RF) welding or heat welding enabling its use on current device manufacturing equipment. Certain embodiments of the flexible monolayer elastomer film of the instant invention can be sterilized by gamma radiation. There is minimal visual or physical property changes when the elastomer film is exposed to high levels of gamma radiation. Other certain embodiments of the flexible monolayer elastomer film of the instant invention can be sterilized by autoclaving. The film of the instant invention has excellent performance at low temperatures. Certain embodiments of the film of the instant invention remain flexible, and do not become brittle when stored in liquid nitrogen.

The absence of extractables exhibited by the flexible monolayer elastomer film of the instant invention makes it ideally suited for the most critical of device applications. No plasticizer or surfactants are added to the film of the instant invention. Therefore, the flexible monolayer elastomer film of the instant invention is free or at least essentially free of leachable materials, such as plasticizers. In addition, the film of the instant invention is resistant to most acids and bases.

The flexible monolayer elastomer films of the instant invention have excellent strength to thickness ratios. The excellent strength to thickness ratio allows for significant down gauging. For example, an article fabricated from a 0.009" thick film of the instant invention will exhibit the strength and durability equivalent to a 0.014" thick soft PVC film. The yield for a 0.009"×12" films of the instant invention is 7.8 yards per pound. For comparison, a typical 0.014"×12" PVC film has a yield of only 4.0 yards per pound.

The unique combination of properties of the film of the instant invention allows the film's use in applications such as intravenous solution storage, drug delivery, nutritional solutions, storage of blood components, stem cell storage, bone marrow storage, peritoneal dialysis, and drainage collection as well as many other critical end uses.

Certain embodiments of the flexible monolayer elastomer film of the instant invention can be manufactured in thicknesses ranging from 0.006" to 0.020" at widths up to 34" and with surface finishes of polish/matte, taffeta/matte or matte/matte. Typical tolerance for the film thickness is +/−0.001" and +/−0.125" for the film width.

Certain embodiments of the flexible monolayer elastomer film of the instant invention are specially formulated to meet USP Class VI and European Pharmacopoeia requirements.

In certain embodiments of the flexible monolayer elastomer film of the instant invention, the film comprises SEPS. The film has a texture substantially that of plasticized polyvinyl chloride and the film is essentially free of leachable material. The film is essentially free of plasticizers, such as oils, and surfactants. In embodiments of the instant invention containing SEPS, the amount of SEPS in the film is from about 5% to about 90% by weight of the film. In certain embodiments, the amount of SEPS in the film is from about 15% to about 90% by weight of the film. In other certain embodiments the amount of SEPS in the film is from about 15% to about 25% of the weight of the film. A suitable SEPS for certain embodiments of the present invention is a medical grade SEPS, Hybrar® 7125, from Kuraray Co., Ltd.

The film of the instant invention can further comprise a polyolefin in an amount of about 5% to about 50% by weight of the film. In certain embodiments the amount of polyolefin is from about 14% to about 30% by weight of the film. Among the polyolefins in certain embodiments of the instant invention are: a metallocene catalyzed polyethylene-octene copolymer, a syndiotactic polypropylene, a polypropylene homopolymer, a polypropylene copolymer, a metallocene catalyzed isotactic polypropylene, a low-density polyethylene, and a linear low-density polyethylene.

Suitable polyolefins for certain embodiments of the instant invention include: Engage EG 8100 metallocene catalyzed saturated ethylene-octene extremely low density copolymer (VvLDPE) from Dow Plastics, Tenite 800A low density polyethylene (LDPE) from Eastman Chemical Company, EOD 96-30 and EOD 99-19 syndiotactic polypropylenes from Atofina Petrochemical, Inc., Dowlex 2045 linear low density polyethylene (LLDPE), Inspire H701-20NA polypropylene homopolymer and H707-12 polypropylene copolymer from Dow Plastics, 3727W Ziegler-Natta catalyzed polypropylene homopolymer, EOD 00-11 metallocene catalyzed isotactic polypropylene and EOD 96-30 syndiotactic polypropylene from Atofina Petrochemical, Inc.

The films of the instant invention can additionally comprise an ethylene-vinyl acetate copolymer (EVA) in an amount of from about 40% to about 90% by weight of the film. In certain embodiments, the amount of ethylene-vinyl acetate copolymer is from about 50% to about 65%. In certain embodiments, the amount of vinyl acetate in the ethylene-vinyl acetate copolymer is about 20% to about 28% by weight of the ethylene-vinyl acetate copolymer. In certain embodiments, the amount of vinyl acetate in the copolymer is about 28%.

Suitable ethylene-vinyl acetate copolymers for use in the films of the instant invention include Escorene Ultra LD 760 and Escorene Ultra LD 768 from ExxonMobil Chemicals, Ateva® 2803MG from AT Plastics, and Ultrathene® UE 634-000 from Equistar Chemicals.

The flexible monolayer elastomer films of the instant invention have high oxygen and carbon dioxide transmission rates and low water vapor transmission rates. The films of the instant invention containing SEPS have an oxygen transmission rate of from about 50 $cm^3/100$ $in^2/24$ hours to about 300 $cm^3/100$ $in^2/24$ hours, a carbon dioxide transmission rate of from about 300 $cm^3/100$ $in^2/24$ hours to about 2100 $cm^3/100$ $in^2/24$ hours, and a water vapor transmission rate of from about 0.05 $g/100$ $in^2/24$ hours to about 1.25 $g/100$ $in^2/24$ hours; for 0.006" thick films. Certain embodiments of the film have an oxygen transmission rate of from about 140 $cm^3/100$ $in^2/24$ hours to about 250 $cm^3/100$ $in^2/24$ hours, a carbon dioxide transmission rate of from about 1050 $cm^3/100$ $in^2/24$ hours to about 1800 $cm^3/100$ $in^2/24$ hours, and a water vapor transmission rate of from about 0.38 $g/100$ $in^2/24$ hours to about 1.25 $g/100$ $in^2/24$ hours; for 0.006" thick films.

In embodiments of the instant invention where the film comprises from about 55% to about 75% by weight of an ethylene-vinyl acetate copolymer and from about 25% to about 45% by weight of an metallocene catalyzed ethylene-octene copolymer the films, the film has an oxygen transmission rate of from about 100 $cm^3/100$ $in^2/24$ hours to about 600 $cm^3/100$ $in^2/24$ hours, a carbon dioxide transmission rate of from about 1000 $cm^3/100$ $in^2/24$ hours to about 5000 $cm^3/100$ $in^2/24$ hours, and a water vapor transmission rate of from about 1.7 $g/100$ $in^2/24$ hours to about 2.7 $g/100$ $in^2/24$ hours; for 0.006" thick films. Certain embodiments of the films of the instant invention containing EVA and metallocene catalyzed ethylene-octene copolymer have an oxygen transmission rate of from about 300 $cm^3/100$ $in^2/24$ hours to about 400 $cm^3/100$ $in^2/24$ hours and a carbon dioxide transmission rate of from about 2500 $cm^3/100$ $in^2/24$ hours to about 3500 $cm^3/100$ $in^2/24$ hours; for 0.006" thick films.

The flexible monolayer elastomer films of the instant invention are formed by mixing the individual polymer components according to the weight fraction of each polymer component in the film. The ingredients of the film may be tumble-blended in a ribbon blender and then heated and fused into pellets. Films of the instant invention and articles are formed from the pellets by extrusion. Alternatively, articles can be formed from the pellets by molding.

COMPARATIVE EXAMPLES

Comparative Example 1 is EH-222 polyvinyl chloride film with trioctyl trimellitate (TOTM) plasticizer from Solvay Draka. Comparative Example 2 is EH-3125 polyvinyl chloride film with (TOTM) plasticizer from Solvay Draka. Comparative Example 3 is ES-3049 polyvinyl chloride film with tributyl citrate plasticizer from Solvay Draka. ES-3000 polyvinyl chloride film is di(2-ethyl hexyl) phthalate from Solvay Draka is Comparative Example 4. Medipak 3250 polyvinyl chloride film from Solvay Draka is Comparative Example 5. Comparative Example 6 is EVA-1800 from Solvay Draka.

EXAMPLES

Example 1 is an extruded monolayer film formed from a mixture of SEPS, EVA, syndiotactic polypropylene, and low-density polypropylene. The film consists of 50% by weight of an EVA containing about 28% by weight vinyl acetate, 20% by weight of Hybrar 7125F SEPS, 15% by weight Atofina Petrochemical EOD 96-30 syndiotactic polypropylene, and 15% by weight Engage 8100 metallocene catalyzed polyethylene-octene copolymer.

Example 2 is an extruded monolayer film formed from a mixture of SEPS, EVA, and extremely low-density polypropylene. The film consists of 50% by weight of an EVA containing about 28% by weight vinyl acetate, 20% by weight of Hybrar 7125F SEPS, and 30% by weight Engage 8100 metallocene catalyzed polyethylene-octene copolymer.

Example 3 is an extruded monolayer film formed from a mixture of SEPS, EVA, and syndiotactic polypropylene. The film consists of 65% by weight of an EVA containing about 28% by weight vinyl acetate, 21% by weight of Hybrar 7125F SEPS, and 14% by weight Atofina Petrochemical EOD 96-30 syndiotactic polypropylene.

Examples 1-3 have excellent clarity, with a light transmission of 89% and have only minimal visual or physical property changes when exposed to high levels of gamma radiation. Examples 1 and 2 have excellent low temperature properties and Example 2 has superior low temperature properties. Disposable medical devices are easily fabricated from the films of Examples 1-3 by RF welding or heat sealing.

TABLE I

| | Comparative Example 1 | Comparative Example 2 | Comparative Example 3 | Example 1 | Example 2 | Example 3 |
|---|---|---|---|---|---|---|
| PHYSICAL PROPERTIES | | | | | | |
| Process | Calender | Calender | Calender | Extruder | Extruder | Extruder |
| RF Weldability | Yes | Yes | Yes | Yes | Yes | Yes |
| Thickness, mils. | 15.0 | 15.0 | 15.0 | 6.0 | 9.0 | 6.0 |
| Hardness, Shore A | 71 | 68 | 67 | 71 | 67 | 70 |
| Specific Gravity | 1.20 | 1.19 | 1.19 | 0.90 | 0.92 | 0.91 |
| Tensile Strength MD(TD), psi | 2000(1800) | 1800(1900) | 2400(2400) | 2580(2150) | 3000(2600) | 2300(2400) |
| Elongation MD(TD), % | 300(300) | 260(300) | 330(330) | 620(720) | 640(700) | 600(790) |
| Modulus MD(TD), Lbs./in. | 1000(900) | 1000(900) | 1050(1050) | 570(470) | 440(380) | 600(440) |
| Tear MD(TD), Lbs./in. | 275(250) | | 220(220) | 235(271) | 239(261) | 240(270) |
| Low Temp. Brittleness ° C. | −32 | −34 | −40 | −75 | −195 | −70 |
| GAS & WATER PROPERTIES: | | | | | | |
| WVTR (gms/100in$^2$/24 Hrs.)@25° C.; 100% RH; 0.006" thick | | 0.82 | 1.70 | 0.97 | 0.69 | 0.75 |
| $O_2$ Transmission (cm$^3$/100in$^2$/24 Hrs.)@25° C.; 0% RH; 0.006" thick | | 78 | 143 | 241 | 186 | 205 |
| $CO_2$ Transmission (cm$^3$/100in$^2$/24 Hrs.)@25° C.; 0% RH; 0.006" thick | | 412 | 1450 | 1770 | 1242 | 1551 |
| STERILIZATION: | | | | | | |
| Gamma Resistance, Color Change | Minimal | Minimal | Minimal | Minimal | Minimal | Minimal |
| Steam, 121° C. | Yes | Yes | Yes | No | No | No |
| BIOSAFETY CONFORMITY: | NAmSA, '01 | NAmSA, '01 | NamSA, '01 | Toxikon, '01 | Toxikon, '01 | Toxikon, '01 |
| European Pharmacopoeia Protocol Testing(*) | | Conforms | | Conforms | Conforms | |
| Biocompability Testing(**) | Pass | Pass | Pass | Pass | Pass | Pass |
| CHEMICAL PROPERTIES: | | | | | | |
| Reducing Substances | 0.5 | 0.3 | 0.4 | 0.1 | 0.2 | 0.2 |
| $UV_{220}$ | 0.09 | 0.17 | 0.09 | 0.00 | 0.02 | 0.01 |
| pH | 5.6 | 6.0 | 5.9 | 6.0 | 6.1 | 5.9 |
| pH Shift | 0.4 | 0.1 | 0.1 | 0.2 | 0.2 | 0.1 |
| Extractable Aluminum, ppm | 0.01 | 0.00 | 0.00 | 0.01 | 0.01 | 0.00 |
| Extractable Calcium, ppm | 0.0 | 0.3 | 0.5 | 0.2 | 0.3 | 0.1 |
| Extractable Zinc, ppm | 0.7 | 0.7 | 1.3 | 0.0 | 0.0 | 0.0 |

(*)Conforms to the European Pharmacopoeia 3$^{rd}$ edition 3.1.6 test protocol.
(**)USP Class VI The various physical characteristics displayed in Tables I, II, and III are determined via the test methods listed below.

| Physical Characteristic | Test Method |
|---|---|
| Durometer Hardness, Shore A | ASTM D-2240 |
| Specific Gravity | ASTM D-792 |
| Tensile Strength, psi | ASTM D-638 |
| Elongation at Break, % | ASTM D-638 |
| Modulus at 100% Elong. psi | ASTM D-638 |
| Tear Resistance, lbf/in. | ASTM D-1004 |
| Low Temperature Brittleness, ° C. | ASTM D-1790 |
| WVTR (gms/100 in$^2$/24 Hrs.)@ (25° C.; 100% RH); (0.006" thick) | ASTM E-96-80 |
| Oxygen Transmission (cm$^3$/100 in$^2$/24 Hrs.)@ (25° C.; 0% RH); (0.006" thick) | ASTM D-3985 |
| Carbon Dioxide Trans. (cm$^3$/100 in$^2$/24 Hrs.)@ (25° C.; 0% RH); (0.006" thick) | ASTM D-1434 |

| European Pharmacopoeia Tests | Specification |
|---|---|
| Reducing Substances, mg/20 ml | 2.0 max. |
| UV at 220 nm, | 0.20 max. |
| pH | 5.0 to 7.0 |
| pH Shift | −1 to +1 |
| Extractable Aluminum, ppm | 0 to 0.05 |
| Extractable Calcium, ppm | 0 to 2.0 |
| Extractable Zinc, ppm | 0 to 2.0 |

Example 4 is an extruded monolayer film formed from a mixture of SEPS and Ziegler-Natta catalyzed polypropylene. The film consists of 70% by weight of Hybrar 7125F SEPS, and 30% by weight Atofina Petrochemical 3727W polypropylene. The film of example 4 provides excellent clarity with a light transmission of 90%. The film of Example 4 can be easily fabricated by heat sealing and can be sterilized by gamma irradiation, ethylene oxide, or autoclaving at 121° C. In addition, the film of Example 4, has extremely low levels of extractable metals.

TABLE II

| | Comparative Example 4 | Comparative Example 5 | Example 4 |
|---|---|---|---|
| PHYSICAL PROPERTIES: | | | |
| Process | Calender | Extruder | Extruder |
| RF Weldablity | Yes | Yes | No |
| Thickness, mils | 15.0 | 14.0 | 10.0 |
| Hardness, Shore A | 75 | 80 | 70 |
| Specific Gravity | 1.23 | 1.24 | 0.91 |
| Tensile Strength MD(TD), psi | 2800(2600) | 3600(3500) | 2545(2771) |
| Elongation MD(TD), % | 280(300) | 340(390) | 752(821) |
| Modulus MD(TD), psi | 1250(1050) | 1700(1600) | 453(449) |
| Tear MD(TD), Lbs./in. | 300(300) | 550(520) | 234(248) |
| Low Temp. Brittleness ° C. | −29 | −26 | −15 |
| GAS & WATER PROPERTIES: | | | |
| WVTR (gms/100 in$^2$/24 Hrs.) 25° C.; 100% RH; 0.006" thick | 0.53 | 0.32 | 0.09 |
| $O_2$ Transmission (cm$^3$/100 in$^2$/24 Hrs.) 25° C.; 0% RH; 0.006" thick | 44 | 28 | 68 |
| $CO_2$ Transmission (cm$^3$/100 in$^2$/24 Hrs.) 25° C.; 0% RH; 0.006" thick | 299 | 183 | 328 |
| STERILIZATION: | | | |
| Gamma Resistance, Color Change | Minimal | Moderate | Slight |
| Steam, 121° C. | Yes | yes | Yes |
| BIOSAFETY CONFORMITY | NAmSA, '01 | Toxikon, 100 | Toxikon, '01 |
| European Pharmacopoeia Protocol Testing(*) | | Conforms | |
| Bicompatibility Testing(**) | Pass | pass | Pass |
| CHEMICAL PROPERTIES: | | | |
| Reducing Substances | 0.3 | 1.0 | 0.2 |
| $UV_{220}$ | 0.09 | 0.12 | 0.01 |
| pH | 5.6 | 5.5 | 5.9 |
| pH Shift | 0.4 | −0.2 | 0.0 |
| Extractable Aluminum, ppm | 0.01 | 0.00 | 0.00 |
| Extractable Calcium, ppm | 0.2 | 0.4 | 0.1 |
| Extractable Zinc, ppm | 0.6 | 1.0 | 0.0 |

(*)Conforms to tie European Pharmacopoeia 3$^{rd}$ edition 3.1.6 test protocol.
(**)USP Class VI Example 5 is an extruded monolayer film formed from a mixture of EVA and extremely low density polyethylene. The film consists of 65% by weight of an EVA containing about 28% by weight vinyl acetate, and 35% by weight Engage 8100 metallocene catalyzed polyethylene-octene copolymer. Example 5 provides superior low temperature properties, and excellent clarity with a light transmission of 91%. The film of Example 5 can be easily fabricated by RF welding or heat sealing. Extremely high oxygen and carbon dioxide transmission is provided by the film of Example 5. In addition, the film of Example 5, has extremely low levels of extractable metals.

The Exemplary films and the Comparative Examples underwent in vitro and in vivo testing by independent labs, such as NAmSA and Toxikon to demonstrate compliance with biomedical safety standards. The following tests, in accordance with USP and European ISO 10993 protocols were performed:
 ISO Intracutaneous Reactivity, Part 10
 ISO Systemic Toxicity, Part 11
 ISO Muscle Implantation with Hystopathology, Part 6
 ISO Hemolysis in Vitro, Part 4
 ISO Cytotoxicity (MEM Extraction), Part 5.
 USP Physico-Chemical Tests
 USP LAL Endotoxin Test in Vitro.

The films of Examples 1-5 passed all of the above-listed biomedical safety standards.

TABLE III

| | Comparative Example 4 | Comparative Example 5 | Example 4 |
|---|---|---|---|
| PHYSICAL PROPERTIES: | | | |
| Process | Calender | Extruder | Extruder |
| RF Weldability | Yes | Yes | Yes |
| Thickness, mils. | 15.0 | 14.0 | 6.0 |
| Hardness, Shore A | 75 | 90 | 70 |
| Specific Gravity | 1.23 | 0.939 | 0.92 |
| Tensile Strength MD(TD), psi | 2800(2600) | 2550(2500) | 3000(2800) |

TABLE III-continued

|  | Comparative Example 4 | Comparative Example 5 | Example 4 |
|---|---|---|---|
| Elongation MD(TD), % | 280(300) | 400(700) | 600(700) |
| Modulus MD(TD), Lbs./in. | 1250(1050) | 980(860) | 630(480) |
| Tear MD(TD), Lbs./in. | 300(300) | 4(5) | 280(280) |
| Low Temp. Brittleness ° C. | −29 | −59 | −195 |
| GAS & WATER PROPERTIES: | | | |
| WVTR (gms/100 in$^2$/24 Hrs.) @25° C.; 100% RH; 0.006" thick | 0.53 | 0.30 | 2.2 |
| $O_2$ Transmission (cm$^3$/100 in$^2$/24 Hrs.) @25° C.; 0% RH; 0.006" thick | 44 | 73 | 359 |
| $CO_2$ Transmission (cm$^3$/100 in$^2$/24 Hrs.) @25° C.; 0% RH; 0.006" thick | 299 | 386 | 2,954 |
| STERILIZATION: | | | |
| Gamma Resistance, Color Change | Minimal | Minimal | Slight |
| Steam, 121° C. | Yes | No | No |
| BIOSAFETY CONFORMITY: | NAmSA, '01 | NAmSA, '97 | Toxikon, '01 |
| European Pharmacopoeia Protocol Testing(*) | | | Conforms |
| Biocompability Testing(**) | Pass | Pass | Pass |
| CHEMICAL PROPERTIES: | | | |
| Reducing Substances | 0.3 | 0.1 | 0.3 |
| $UV_{220}$ | 0.09 | 0.04 | 0.02 |
| pH | 5.6 | 4.7 | 6.0 |
| pH Shift | 0.4 | −1.0 | 0.1 |
| Extractable Aluminum, ppm | 0.01 | 0.00 | 0.00 |
| Extractable Calcium, ppm | 0.2 | 0.0 | 0.1 |
| Extractable Zinc, ppm | 0.6 | 0.0 | 0.0 |

(*)Conforms to the European Pharmacopoeia $3^{rd}$ edition 3.1.6 test protocol.
(**)USP Class VI Other embodiments of the flexible monolayer elastomer film of the instant invention include a film consisting of 60% by weight of an EVA containing about 28% by weight vinyl acetate, 20% by weight of Hybrar 7125F SEPS, and 20% by weight of Tenite 800A LDPE. Another embodiment consists of 60% by weight of an EVA containing about 28% by weight vinyl acetate, 20% by weight of Hybrar 7125F SEPS, and 20% by weight of Atofina Petrochemical EOD 99-19 syndiotactic polypropylene. Other embodiments consist of 50% by weight of an EVA containing about 28% by weight vinyl acetate, 20% by weight of Hybrar 7125F SEPS, and 15% by weight of Atofina Petrochemical EOD 65-30 syndiotactic polypropylene, and 15% by weight of Dowlex 2045 LLDPE; 70% by weight of Hybrar 7125F SEPS and 30% by weight of Dow Inspire H701-20NA polypropylene or H707-12 polypropylene copolymer; 80% by weight of Hybrar 7125F SEPS and 20% by weight Dow Inspire H701-20NA polypropylene or H707-12 polypropylene copolymer; and 85% by weight of Hybrar 7125F SEPS and 15% by weight Atofina Petrochemical 3727W Ziegler-Natta catalyzed polypropylene or EOD 00-11 metallocene catalyzed isotactic polypropylene.

FIG. 1 embodies one aspect of the instant invention. Disposable medical devices, such as the blood component bag 10 of FIG. 1 are formed by heat sealing or RF welding monolayer films of the instant invention. Blood component bag 10 comprises a connector 12 connected to a length of flexible tubing 14, through which the blood components are introduced into the blood component bag 10. The tubing 14 may contain a phlebotomy needle (not shown) at its terminal end or may be connected to another container (not shown). The blood component bag 10 additionally comprises one or more sealable access ports 16. The connector 12, flexible tubing 14, access ports 16, and bag walls 18 are all made from the flexible monolayer elastomer film of the instant invention.

The flexible bag 10 of the instant invention is formed by RF welding or heat sealing the monolayer elastomer walls 18 of the bag 10 along the edges 20. Certain embodiments of the flexible bag 10 can be stored in liquid nitrogen without becoming brittle. Other embodiments of blood component bag 10 have excellent high temperature properties and can be sterilized by autoclaving at a temperature of about 121° C. or higher. Alternatively, the flexible bag 10 can be sterilized by gamma radiation or ethylene oxide.

The embodiments described in the instant disclosure are for illustrative purposes only. They should not be construed to limit the scope of the claims. As is clear to one of ordinary skill in the art, the instant disclosure encompasses a wide variety of embodiments not specifically described herein.

What is claimed is:

1. A flexible monolayer elastomer film consisting essentially of from about 55% to about 75% by weight of an ethylene-vinyl acetate copolymer and from about 25% to about 45% by weight of a metallocene catalyzed ethylene-octene copolymer, the film having a texture, the texture being substantially that of plasticized polyvinyl chloride, and wherein the film is essentially free of leachable material.

2. A flexible monolayer bag for storing medical products, wherein the bag is formed from the flexible monolayer elastomer film of claim 1.

3. The flexible monolayer elastomer film of claim 1, wherein the film has an oxygen transmission rate of from about 100 cm$^3$/100 in$^2$/24 hours to about 600 cm$^3$/100 in$^2$/24 hours, a carbon dioxide transmission rate of from about 1000 cm$^3$/100 in$^2$/24 hours to about 5000 cm$^3$/100 in$^2$/24 hours, and a water vapor transmission rate of from about 1.7 g/100 in$^2$/24 hours to about 2.7 g/100 in$^2$/24 hours; for 0.006" thick films.

4. The flexible monolayer elastomer film of claim 1, wherein the film has an oxygen transmission rate of from about 300 cm$^3$/100 in$^2$/24 hours to about 400 cm$^3$/100 in$^2$/24 hours and a carbon dioxide transmission rate of from about 2500 cm$^3$/100 in$^2$/24 hours to about 3500 cm$^3$/100 in$^2$/24 hours; for 0.006" thick films.

5. A flexible monolayer elastomer film consisting essentially of from about 55% to about 75% by weight of an ethylene-vinyl acetate copolymer, from about 25% to about 45% by weight of a metallocene catalyzed ethylene-octene copolymer, and optionally 5% to 20% by weight of one or more of a styrene-ethylene-propylene-styrene block copolymer, a syndiotactic polypropylene, a polypropylene homopolymer, a polypropylene copolymer, a metallocene catalyzed isotactic polypropylene, a low-density polyethylene, and a linear low-density polyethylene, the film having a texture, the texture being substantially that of plasticized polyvinyl chloride, and wherein the film is essentially free of leachable material.

6. A flexible monolayer bag for storing medical products, wherein the bag is formed from the flexible monolayer elastomer film of claim 5.

7. The flexible monolayer elastomer film of claim 5, wherein the film has an oxygen transmission rate of from about 100 cm$^3$/100 in$^2$/24 hours to about 600 cm$^3$/100 in$^2$/24 hours, a carbon dioxide transmission rate of from about 1000 cm$^3$/100 in$^2$/24 hours to about 5000 cm$^3$/100 in$^2$/24 hours, and a water vapor transmission rate of from about 1.7 g/100 in$^2$/24 hours to about 2.7 g/100 in$^2$/24 hours; for 0.006" thick films.

8. The flexible monolayer elastomer film of claim 5, wherein the film has an oxygen transmission rate of from about 300 cm$^3$/100 in$^2$/24 hours to about 400 cm$^3$/100 in$^2$/24 hours and a carbon dioxide transmission rate of from about 2500 cm$^3$/100 in$^2$/24 hours to about 3500 cm$^3$/100 in$^2$/24 hours; for 0.006" thick films.

* * * * *